United States Patent
Hsu et al.

(10) Patent No.: US 7,909,550 B1
(45) Date of Patent: Mar. 22, 2011

(54) SWIVEL SPINDLE HEAD WITH GEAR DEVICE DRIVEN BY MULTIPLE TORQUE MOTORS

(75) Inventors: Chin-Mou Hsu, Taichung (TW); Ching-Yuan Lin, Taichung (TW); En-Sheng Chang, Taichung (TW); Shih-Yen Chung, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 12/616,608

(22) Filed: Nov. 11, 2009

(30) Foreign Application Priority Data

Sep. 29, 2009 (TW) .............................. 98132876 A

(51) Int. Cl.
    *B23C 1/12* (2006.01)
(52) U.S. Cl. ........................................ 409/201; 409/216
(58) Field of Classification Search ................. 409/201, 409/211, 216, 231–232; 408/236; *B23C 1/12*
    See application file for complete search history.

(56) References Cited

U.S. PATENT DOCUMENTS

| | | | |
|---|---|---|---|
| 3,460,435 A * | 8/1969 | Dahl et al. ..................... | 409/183 |
| 5,385,436 A * | 1/1995 | Corsi ........................... | 409/201 |
| 5,538,375 A * | 7/1996 | Kwapisz ........................ | 409/201 |
| 5,584,621 A | 12/1996 | Bertsche et al. | |
| 6,746,188 B2 * | 6/2004 | Watanabe ....................... | 409/201 |
| 7,470,095 B2 | 12/2008 | Brunemann | |
| 2007/0059116 A1 * | 3/2007 | Brunemann ..................... | 409/201 |

OTHER PUBLICATIONS

English abstract and clipped drawing for TW 200924881-A, which '881 was published on Jun. 16, 2009.*

* cited by examiner

*Primary Examiner* — Erica E Cadugan
(74) *Attorney, Agent, or Firm* — Tim Tingkang Xia; Morris, Manning & Martin, LLP

(57) ABSTRACT

A swivel spindle head with gear device driven by multiple torque motors is disclosed, which comprises: a tool spindle, having a first shaft and a second shaft being radially disposed at two opposite sides of the tool spindle while sharing a common axial line; a plurality of torque motors, radially disposed at a side of the tool spindle; and a reduction gear set, radially disposed at a side of the tool spindle opposite to the plural torque motors, composed of a plurality of driving gears and a driven gear; wherein the amount of the plural driving gears is the same as that of the plural torque motors while enabling each of the plural driving gears to connect with a rotor shaft of its corresponding torque motor, and the same time, connecting the driven gear on the second shaft of the tool spindle.

12 Claims, 7 Drawing Sheets

Swivel Spindle Head where Angular Encoder is disposed in a space at the same side of the tool spindle as the second shaft

FIG. 7

Swivel Spindle Head where the at least one braking element is disposed in a space at the same side of the tool spindle as the first shaft

SWIVEL SPINDLE HEAD WITH GEAR DEVICE DRIVEN BY MULTIPLE TORQUE MOTORS

FIELD OF THE INVENTION

The present invention relates to a swivel spindle head with gear device driven by multiple torque motors, and more particularly, to a swivel spindle head with gear device capable of preventing the problem of backlash from happening in its gear device and the same time reducing its output power loss by the control of a plurality of synchronized torque motors while enabling at least one of the plural torque motors to be configured with an additional rotary encoder for enhancing the control of the synchronization of the torque motors.

BACKGROUND OF THE INVENTION

With rapid advance in the calculation speed of the CNC controllers in today's machine tools and in addition to the ever-evolving CAD/CAM software, the use of multiple-axes machining technology is becoming more and more popular and common as well. In conventional multiple-axes machine tools such as five axes milling machines, the swivel spindle head is controlled by remotely mounted servo motors which use timing belts, worm gears and worm wheels, coupled to rotate the spindle head. However, it either suffers the problem of insufficient toque, or it will have a backlash problem resulting from the wear and tear of its worm gears and worm wheels as then are usually made of copper. Some prior arts had addressed the aforesaid problems by designing a swivel spindle head to be driven directly by torque motors, in short, a direct drive swivel spindle head is provided which is featuring by its ability to operate at low rotation speed and high torque. Nevertheless, when a swivel spindle head requires larger torque output, the overall volume of it will increase with the increasing of its torque motor size. Thus, it is in need of a swivel spindle head design for enabling the same to have larger torque output without the trading of the increasing of its volume, and also with lower manufacture cost as well.

There is a gearless, direct drive, multiple axes rotary spindle head for a machine tool, disclosed in U.S. Pat. No. 5,584,621, entitled "Direct drive multiple axes rotary spindle head for milling machine". However, as the aforesaid spindle head has two torque motors, being arranged symmetrically for directly driving and controlling the rotation, it is required to have the two torque motors to be replaced by some other torque motors with larger torque output when the rotary spindle head requires higher torque, and thus the manufacture cost is increased.

Another such direct drive rotary spindle head is disclosed in U.S. Pat. No. 7,470,095, entitled "Mobile milling head with torque motor drive". Its reduction gear system is composed of a pair of driving and driven gears while the driven gear is the assembly of two separate plates capable of rotating relative to each other for backlash compensation. However, it is noted that not every tooth of the gears in the reduction gear system can free from backlash by the aforesaid design, and also as the driven gear is composed of two separate plates, the clamping of the two can be loosen when the driven gear is subjected to a comparatively large torque so that its mechanical reliability might not be satisfactory.

SUMMARY OF THE INVENTION

The object of the present invention is to provide a swivel spindle head with gear device capable of preventing the problem of backlash from happening in its gear device and the same time reducing its output power loss by the control of a plurality of synchronized torque motors while enabling at least one of the plural torque motors to be configured with an additional rotary encoder for enhancing the control of the synchronization of the torque motors.

To achieve the aforesaid object, the present invention provides a swivel spindle head with gear device driven by multiple torque motors is disclosed, which comprises: a tool spindle, having a first shaft and a second shaft being radially disposed at two opposite sides of the tool spindle while sharing a common axial line; a plurality of torque motors, radially disposed at a side of the tool spindle; and a reduction gear set, radially disposed at a side of the tool spindle opposite to the plural torque motors, composed of a plurality of driving gears and a driven gear while each driving gear is further split into two gears; wherein the amount of the plural driving gears is the same as that of the plural torque motors while enabling each of the plural driving gears to connect with a rotor shaft of its corresponding torque motor, and the same time, connecting the driven gear on the second shaft of the tool spindle.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 7 is a schematic representation of a swivel spindle head where the angular encoder is disposed in a space at the same side of the tool spindle as the second shaft.

FIG. 8 is a schematic representation of a swivel spindle head where the at least one braking element is disposed in a space at the same side of the tool spindle as the first shaft.

DESCRIPTION OF THE EXEMPLARY EMBODIMENTS

Figure 1:
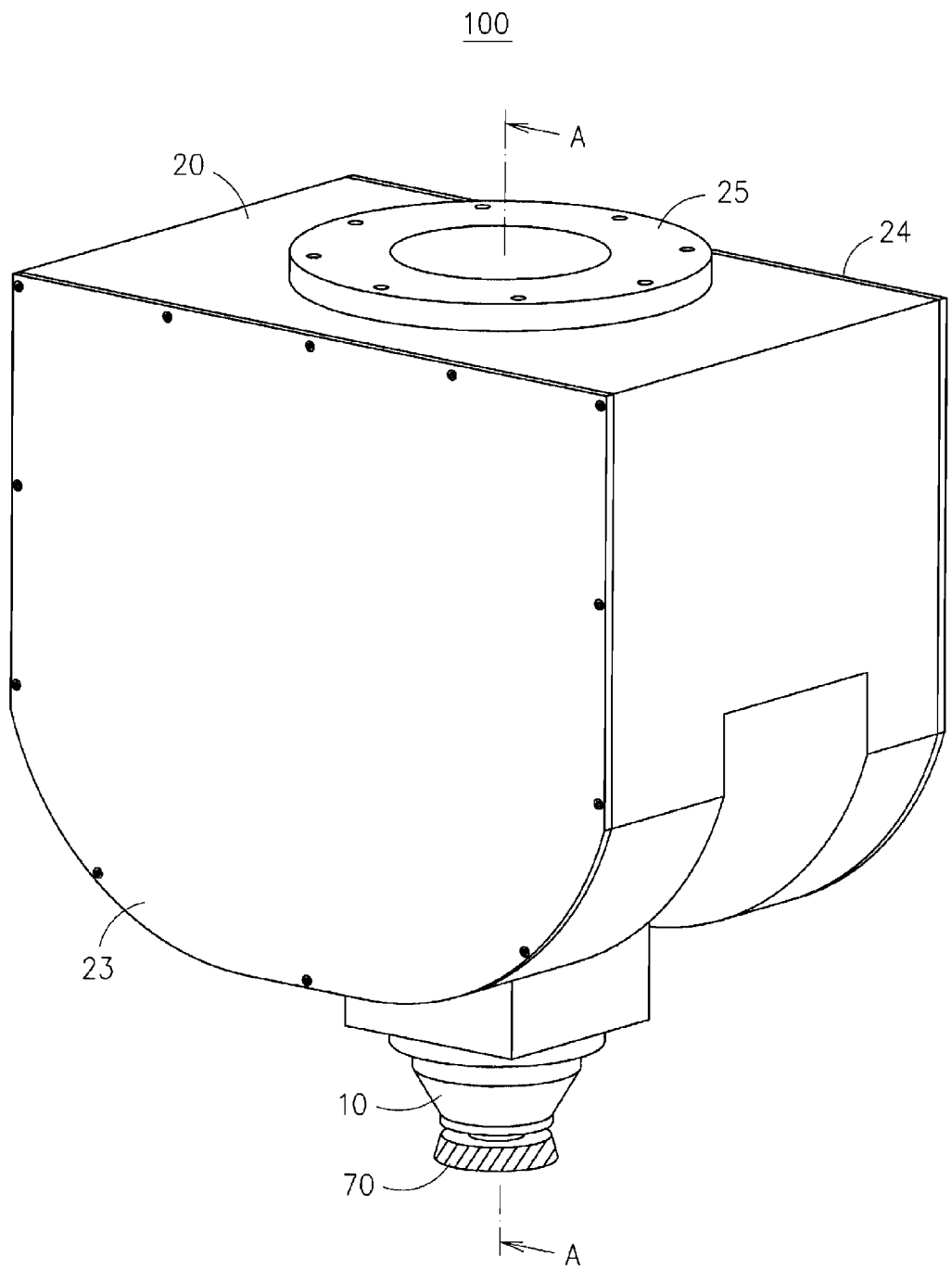
FIG. 1 shows the appearance of a swivel spindle head with gear device driven by multiple torque motors according to an embodiment of the invention.

Please refer to FIG. 1, which shows the appearance of a swivel spindle head with gear device driven by multiple torque motors according to an embodiment of the invention. In FIG. 1, the swivel spindle head 100 of the invention has a tool spindle 10, which is used for holding a cutting tool 70 for a milling process.

Figure 6:
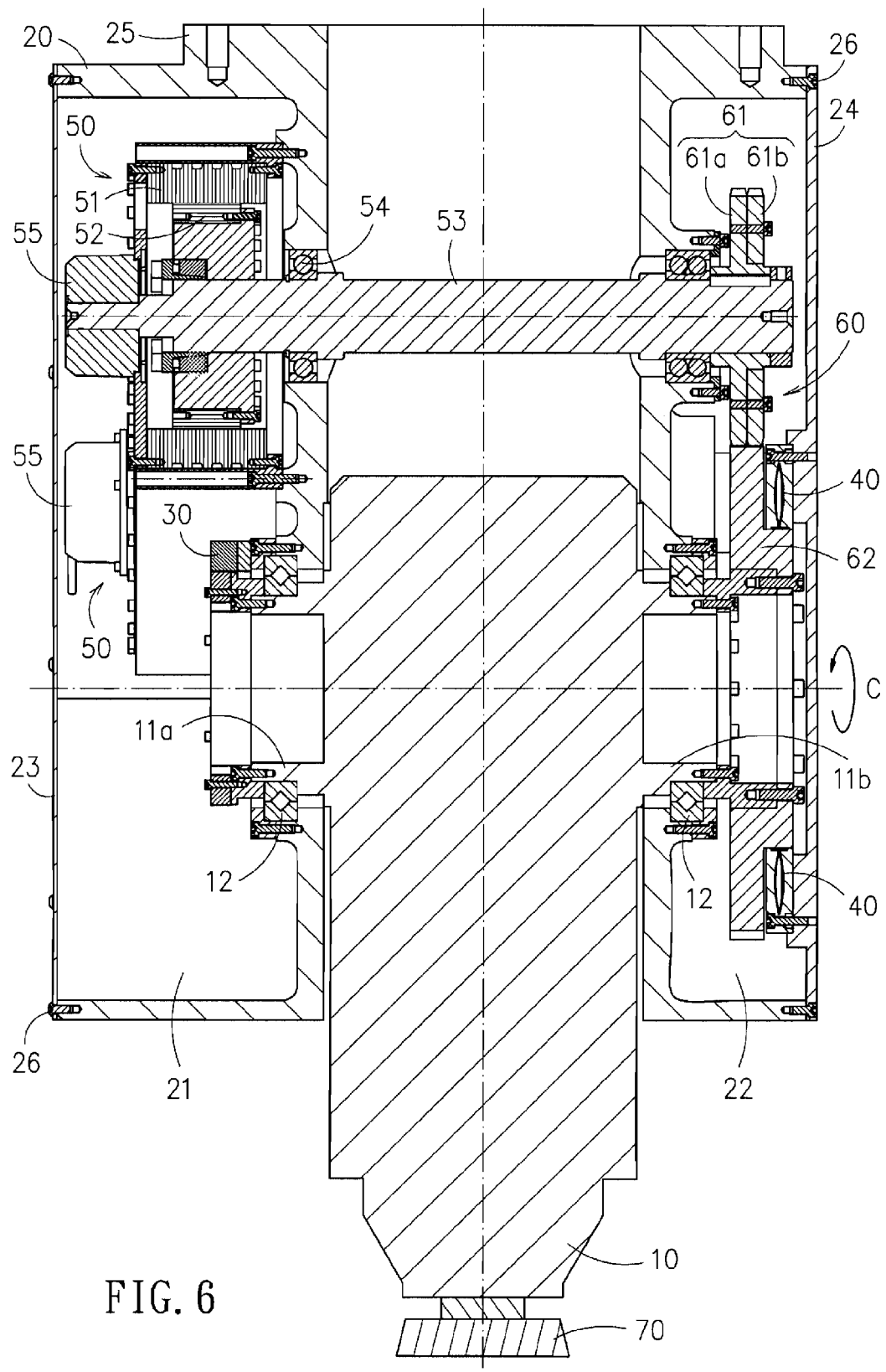
FIG. 6 is an A-A sectional view of FIG. 1.

As shown in FIG. 1 to FIG. 3 and FIG. 6, there is a frame 20 mounted on the top of the tool spindle 10 while enabling a first space 21 and a second space 22 to be formed respectively and radially at two opposite sides of the tool spindle 10. As shown in FIG. 6, there is a plurality of torque motors 50 being arranged inside the first space 21 while there is a reduction gear set 60 being arranged inside the second space 22. Moreover, there are two caps 23, 24 being arranged on the frame 20 at positions corresponding to the first space 21 and the second space 22 respectively for covering the two as the two caps 23, 24 are being fixedly secured by use of bolts 26, by that the plural torque motors 50 and reduction gear set 60 are sealed inside the frame 20 for protection and aesthetic purposes. It is noted that the frame 20 can be fabricated in a manner selected from the group consisting of: it is an integrally formed one-piece component and it is a combined component formed by the assembly of a plurality of parts. In addition, there is an interface 25 fitting on the top of the frame 20 to be used for fixedly securing the swivel spindle hand 100 or for coupling to a rotate component so as to integrate the swivel spindle head 100 onto a machine tool as the machine tool can be a device selected from the group consisting of: a horizontal machine tool and a vertical machine tool.

As shown in FIG. 1 to FIG. 3 and FIG. 6, the tool spindle 10 has a first shaft 11a and a second shaft 11b, which are radially disposed at two opposite sides of the tool spindle 10 while sharing a common axial line C. Moreover, the first shaft 11a is arranged passing through the first space 21 while the second shaft 11b is arranged passing through the second space 22. As shown in FIG. 6, there is at least one bearing 12 arranged at a side of the first shaft 11a and also the second shaft 11b as well, which are used for enabling the frame to perform a swivel movement. In addition, there are an angular encoder 30 and a plurality of braking elements 40 being arranged at the common axial line C of the first shaft 11a and the second shaft 11b. In this embodiment, the angular encoder 30 is disposed inside the first space 21 while the plural braking elements 40 are disposed inside the second space 22, that is, the angular encoder 30 is disposed at a side of the tool spindle 10 while the braking elements 40 are disposed at another side of the tool spindle 10 radially opposite to the angular encoder 30. However, in another embodiment, the plural braking elements 40 can be disposed inside the first space 21 while the angular encoder 30 can be arranged inside the second space 22, or the braking elements 40 can be disposed in a space at the same side of the angular encoder 30. It is noted that there should be at least one braking element 40 in the swivel spindle head, however, the number of the braking elements 40 can be determined as actual required.

Figure 2:
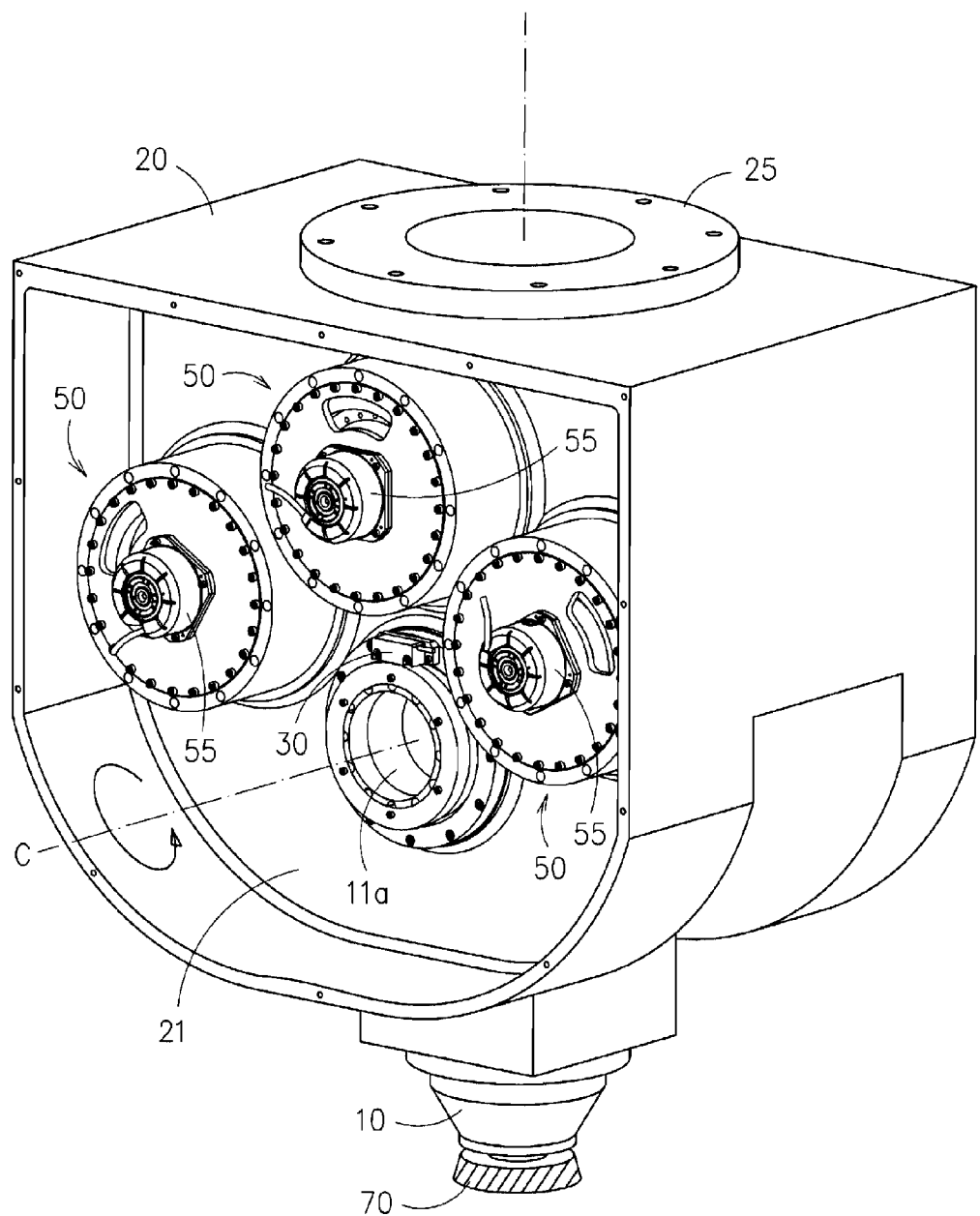
FIG. 2 shows the internal structure of the swivel spindle head of FIG. 1 relating to its torque motor arrangement as the caps are removed.
Figure 4:
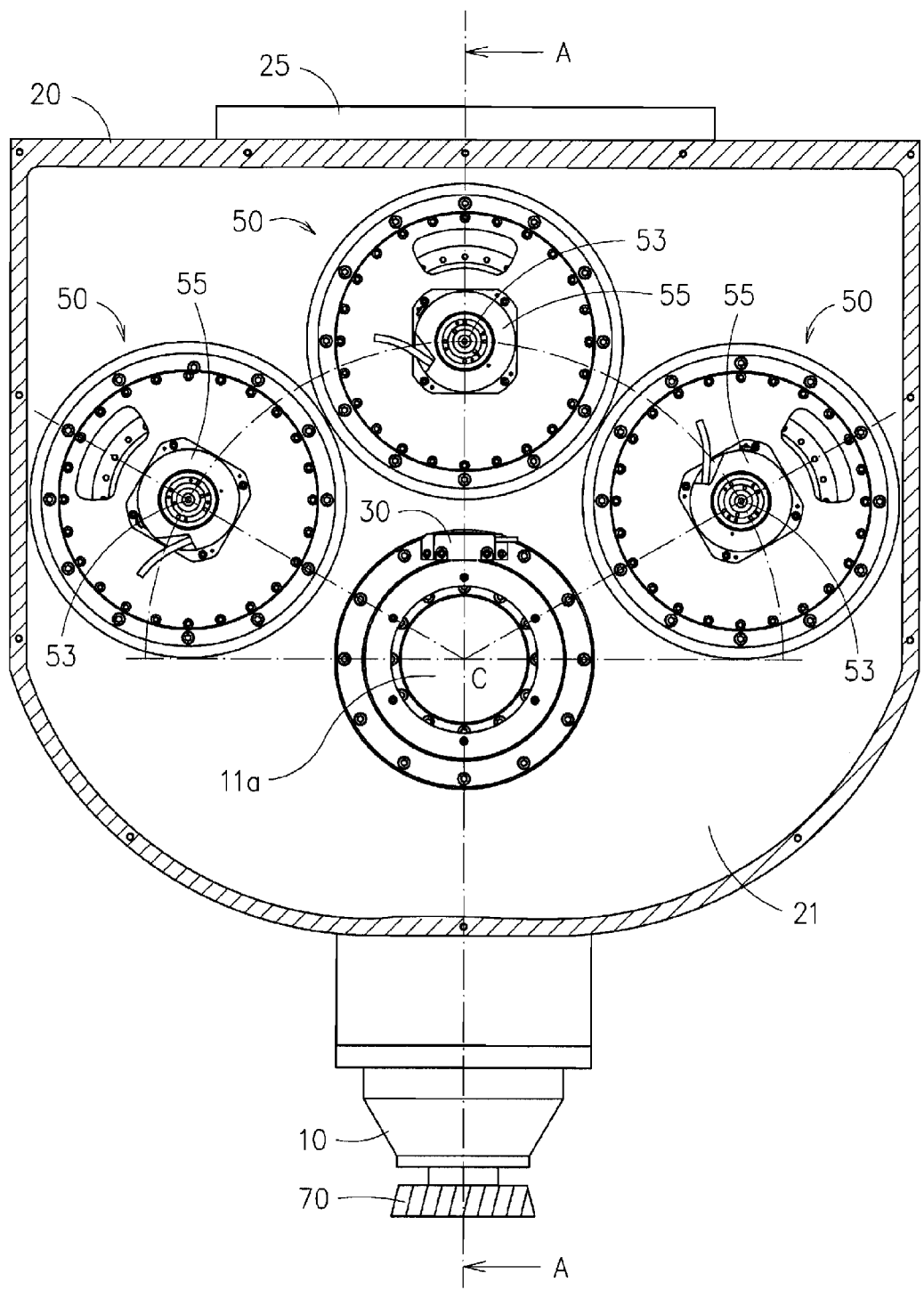
FIG. 4 is a front view of FIG. 2.

As shown in FIG. 2, FIG. 4 and FIG. 6, each of the plural torque motors 50 has a stator 51 and a rotor 52, in that the stator 51, being shaped like a hollow cylinder, is made of electromagnetic coil and is fixedly secured on the frame 20, while the rotor, also shaped like a hollow cylinder received inside the stator 51, is made of a magnetic material so as to generate torque under electromagnetic interaction. Moreover, there is a rotor shaft 53 arranged inside the rotor 52 which has at least one set of supporting bearing 54 mounted thereat for enhancing the rigidity and precision of the rotor shaft 53, as shown in FIG. 6. In addition, for synchronizing the plural torque motors 50, there is at least one rotor shaft 53 in the plural torque motors 50 to be configured with a rotary encoder 55.

Figure 3:
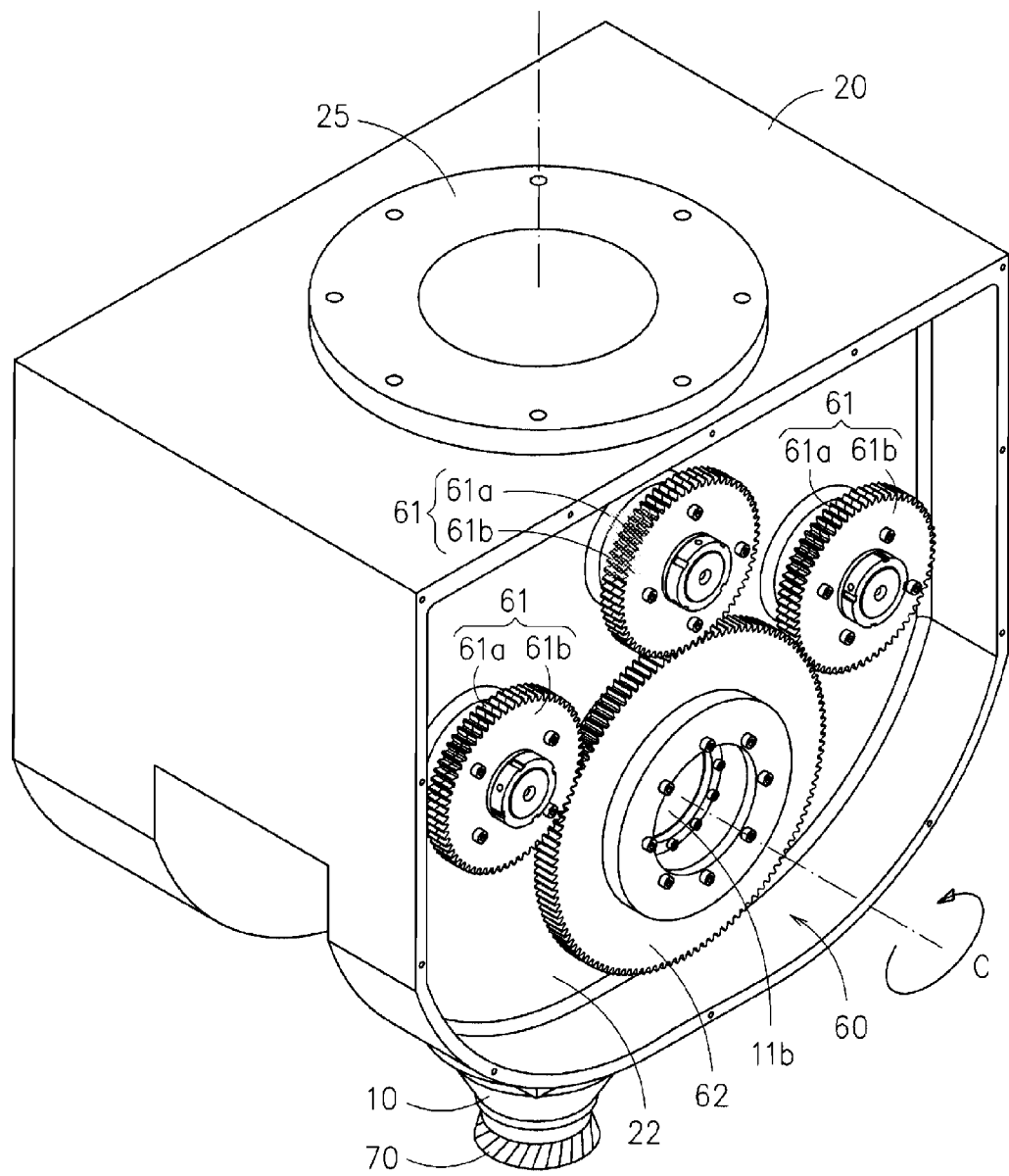
FIG. 3 shows the internal structure of the swivel spindle head of FIG. 1 relating to its reduction gear set as the caps are removed.
Figure 5:
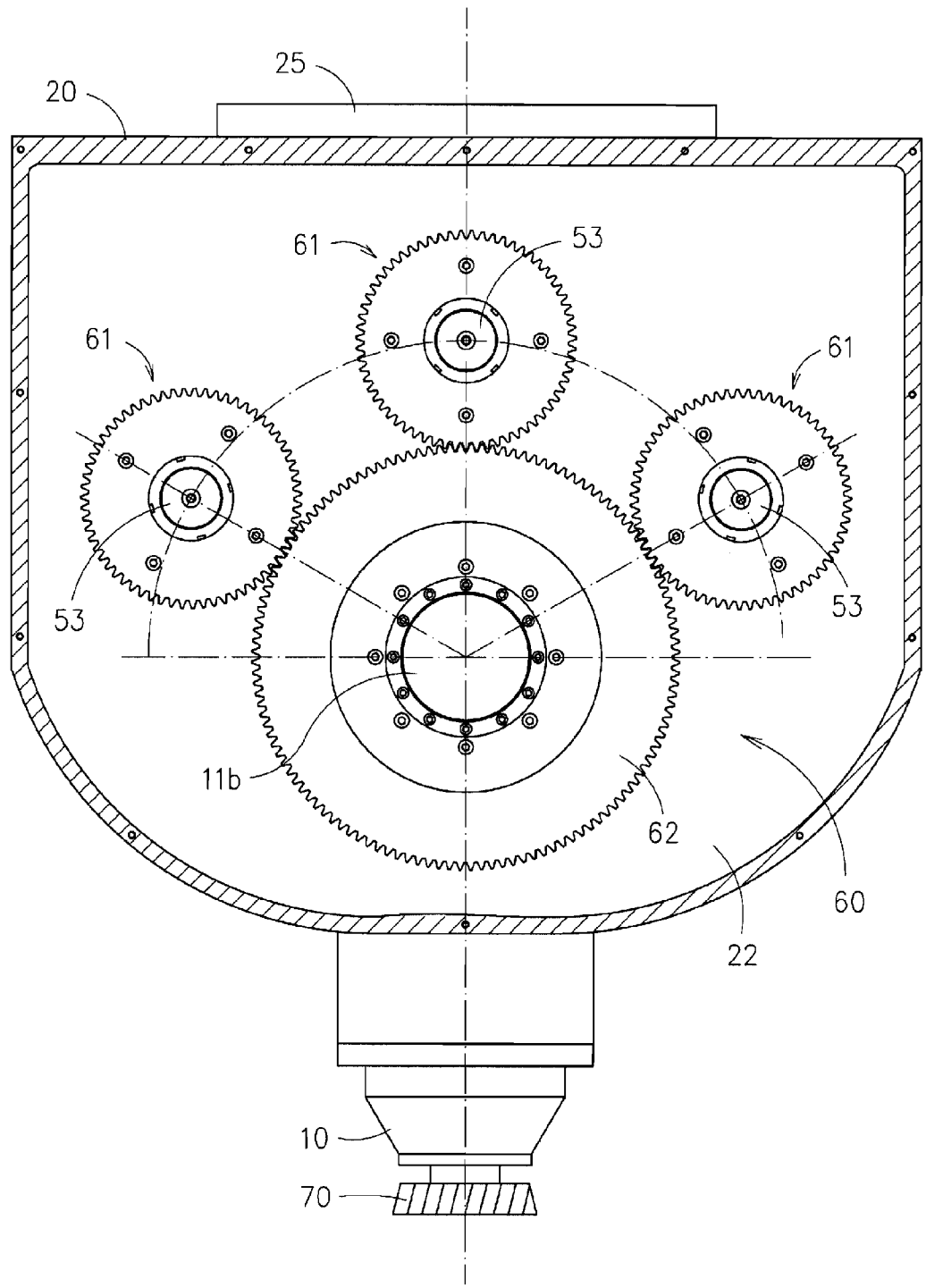
FIG. 5 is a front view of FIG. 3.

As shown in FIG. 3, FIG. 5 and FIG. 6, the reduction gear set 60 is comprised of a plurality of driving gears 61 and a driven gear 62, in which each driving gear 61 is split into two gears 61a, 61b. It is noted that each driving gear 61 is engaged with the driven gear 62 and the amount of the plural driving gears 61 is the same as that of the plural torque motors 50 while enabling each of the plural driving gears 61 to connect with a rotor shaft 53 of its corresponding torque motor 50 as the rotor shaft 53 is simultaneously engaged with the rotor 52. Moreover, the driven gear 62 is disposed on the common axial line C of the first shaft 11a and the second shaft 11b while being enabled to engage with the second shaft 11b.

As shown in FIG. 4 and FIG. 6, when the plural torque motors 50 are being activated to rotate, the plural driving gears 61 are being driven to rotate at the same time and thus bring along the driven gear 62 to rotate accordingly. As each driving gear 61 is split into two gears 61a, 61b, the two gears 61a, 61b are capable of adjusting relative to each other for compensating the backlash between the driving gear 61 and the driven gear 62. Moreover, as the second shaft 11b is designed to be engaged with the driven gear 62, the output torque through the first shaft 11a and the second shaft 11b can be amplified several times to drive the tool spindle 10 for swivel process. It is noted that the angular encoder 30, at this moment, is used for precisely positioning the angle of the tool spindle 10 while the braking elements 40 are used for tightly and fixedly clamping the tool spindle 10.

To sum up, the present invention provides a swivel spindle head with gear device driven by multiple torque motors which is capable of effectively compensating the backlash between its driving gears and driven gear so as to achieve a comparatively higher mechanical reliability as each of its driving gears is split into two gears. In addition, the cost resulting from the torque motors and gear sets can be greatly reduced comparing with those prior arts under the same torque output requirement. Moreover, for enhancing the synchronization of the plural torque motors, there is at least one rotor shaft in the plural torque motors to be configured with a rotary encoder. That is, the present invention use a plurality of synchronized torque motors as power source while enabling their cooperative output torque to be amplified by the use of a reduction gear set, by that not only it can achieve a torque output several times larger than the conventional direct drive multiple axes rotary spindle heads, but also the output torque can be increased when required simply by changing the reduction ratio of the reduction gear set without replacing its torque motors and thus the size and cost of the swivel spindle head will not be greatly increased.

What is claimed is:

1. A swivel spindle head with gear device driven by multiple torque motors, comprising:
    a tool spindle having a longitudinal axis, and having a first swivel shaft and a second swivel shaft being radially disposed at two opposite sides of the tool spindle while sharing a common axial line;
    a plurality of torque motors, radially disposed at a side of the tool spindle;
    and
    a reduction gear set, radially disposed at a side of the tool spindle that is opposite to that of the plural torque motors, being composed of a plurality of driving gears and a driven gear while each driving gear is further split into two gears;
    wherein, the amount of the plural driving gears is the same as that of the plural torque motors while enabling each of the plural driving gears to connect with a rotor shaft of its corresponding torque motor, and the same time, connecting the driven gear on the second shaft of the tool spindle.

2. The swivel spindle head of claim 1, wherein there are an angular encoder and at least one braking element being arranged at the common axial line of the first shaft and the second shaft.

3. The swivel spindle head of claim 2, wherein the angular encoder is disposed at a side of the first shaft while the at least one braking element is disposed at a side of the second shaft.

4. The swivel spindle head of claim 2, wherein the angular encoder is disposed in a space at the same side of the tool spindle as the first shaft or the second shaft.

5. The swivel spindle head of claim 2, wherein the at least one braking element is disposed in a space at the same side of the tool spindle as the first shaft or the second shaft.

6. The swivel spindle head of claim 1, further comprising:
  a frame, mounted on top of the tool spindle, configured with a first space and a second space, wherein the first space is provided for the first shaft to be arranged passing through the same and the plural torque motors to be received therein and the second space is provided for the second shaft to be arranged passing through the same and the reduction gear set to be received therein.

7. The swivel spindle head of claim 6, wherein there are two caps being arranged on the frame at positions corresponding to the first space and the second space respectively for covering the two.

8. The swivel spindle head of claim 6, wherein there is an interface fitting on the top of the frame to be used for fixedly securing the swivel spindle head or for coupling to a rotate component so as to integrate the swivel spindle head onto a machine tool as the machine tool is a device selected from the group consisting of: a horizontal machine tool and a vertical machine tool.

9. The swivel spindle head of claim 6, wherein the frame is fabricated in a manner selected from the group consisting of: it is an integrally formed one-piece component and it is a combined component formed by the assembly of a plurality of parts.

10. The swivel spindle head of claim 1, wherein there is at least one bearing arranged at a side of the first shaft and also the second shaft as well.

11. The swivel spindle head of claim 1, wherein there is at least a set of supporting bearings arranged on each rotor shaft.

12. The swivel spindle head of claim 1, wherein at least one of the rotor shafts is configured with a rotary encoder.

\* \* \* \* \*